United States Patent [19]
Rao

[11] Patent Number: 5,958,625
[45] Date of Patent: Sep. 28, 1999

[54] POSITIVE LEAD-ACID BATTERY GRIDS AND CELLS AND BATTERIES USING SUCH GRIDS

[75] Inventor: Purushothama Rao, Aurora, Ill.

[73] Assignee: GNB Technologies, Inc., Mendota Heights, Minn.

[21] Appl. No.: 08/925,543

[22] Filed: Sep. 8, 1997

Related U.S. Application Data

[60] Provisional application No. 60/027,460, Sep. 23, 1996.

[51] Int. Cl.$^6$ ............................................. H01M 4/68
[52] U.S. Cl. ................................................ 429/241; 429/245
[58] Field of Search ................................ 429/245, 211, 429/242

[56] References Cited

U.S. PATENT DOCUMENTS

| | | | |
|---|---|---|---|
| 3,989,539 | 11/1976 | Grabb | 429/241 |
| 4,099,309 | 7/1978 | Bender | 29/2 |
| 4,166,155 | 8/1979 | Mao et al. | 429/82 |
| 4,221,852 | 9/1980 | Qureshi | 429/211 |
| 4,555,459 | 11/1985 | Anderson et al. | 429/211 |
| 5,308,719 | 5/1994 | Mrotek et al. | 429/160 |
| 5,434,025 | 7/1995 | Rao et al. | 429/245 |
| 5,691,087 | 11/1997 | Rao et al. | 429/245 |
| 5,762,654 | 6/1998 | Kump et al. | 29/623.5 |

Primary Examiner—Maria Nuzzolillo
Assistant Examiner—Angela J. Martin
Attorney, Agent, or Firm—Leyding, Volt & Mayer, Ltd.

[57] ABSTRACT

Positive grids for lead-acid batteries for SLI, industrial battery, and electric vehicle batteries are disclosed in which the positive active material paste pellet openings have a reduced area and the number per square inch of the grid area are increased, the individual areas and the number of paste pellets varying with the intended application, and the preferred embodiments including reduced distances from the center of the paste pellet to the adjacent grid wires, as well as an optimized amount of positive active material per area of the grid wire surface area so as to allow enhanced electrical performance, if desired, or substantial savings in grid weight while achieving electrical performance commensurate with conventional lead-acid cells and batteries.

39 Claims, 15 Drawing Sheets

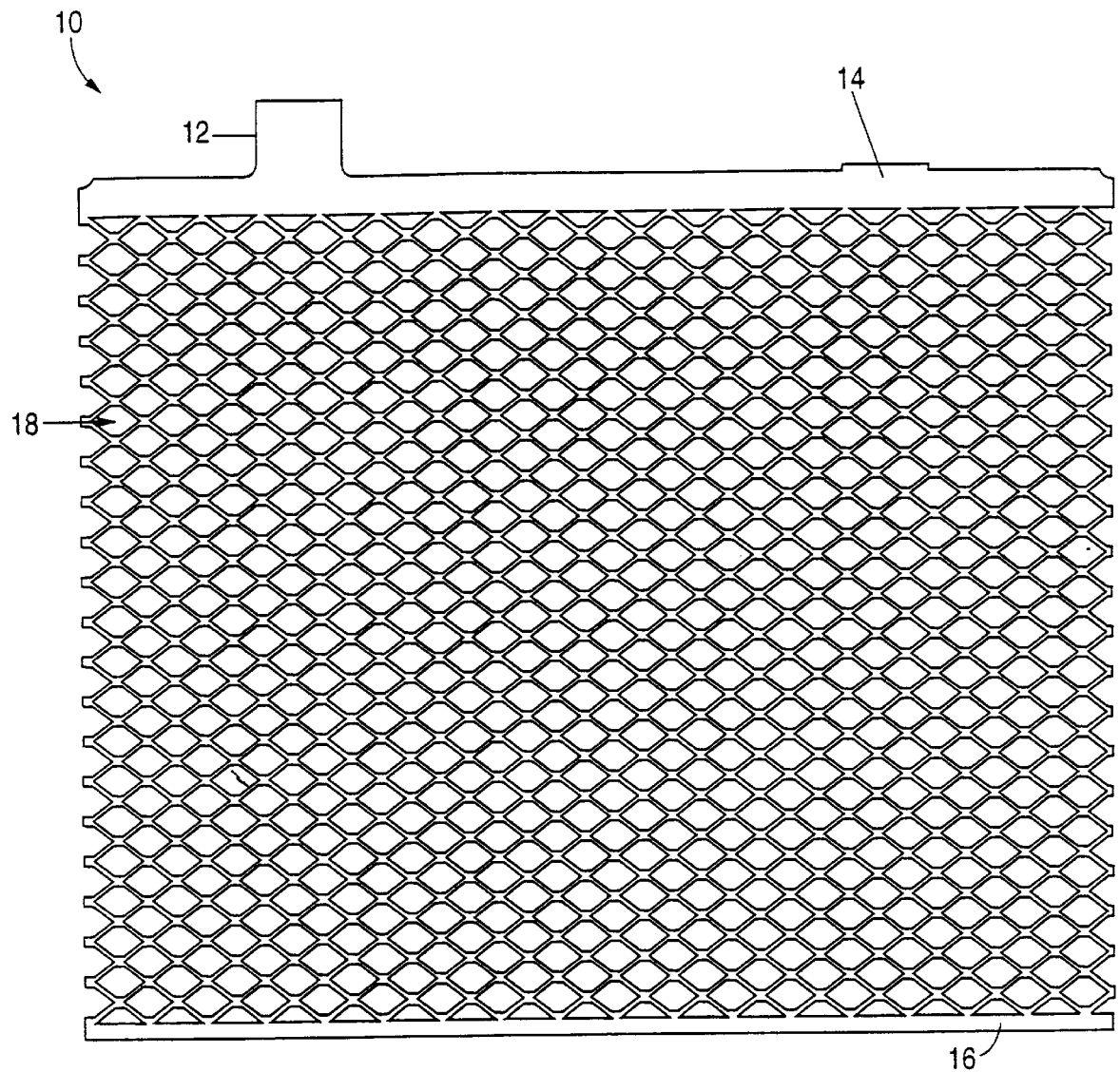
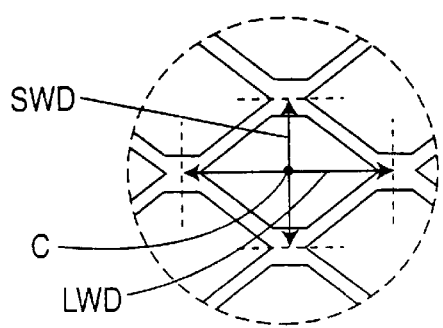
FIG. 1
FIG. 2

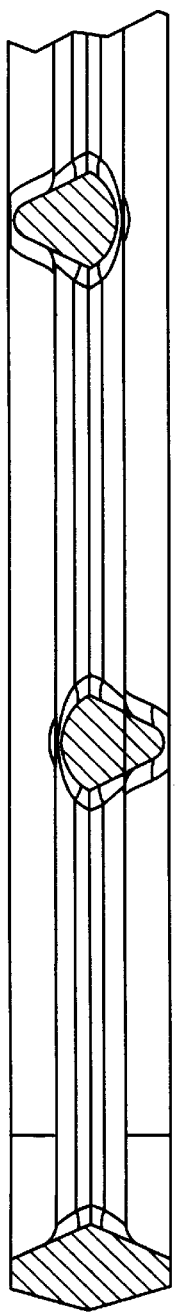
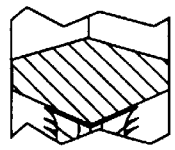
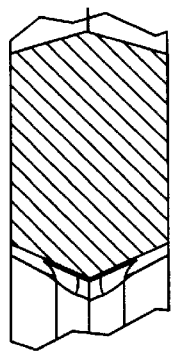
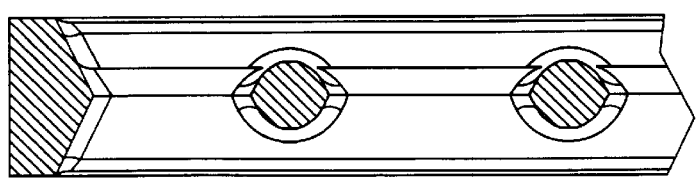
FIG. 15
FIG. 16
FIG. 17
FIG. 18

POSITIVE LEAD-ACID BATTERY GRIDS AND CELLS AND BATTERIES USING SUCH GRIDS

This is a Provisional application No. 60/027,460, filed Sep. 23, 1996.

FIELD OF THE INVENTION

This invention relates to lead-acid cells and batteries and, more particularly, to grids and plates, used in making such cells and batteries.

BACKGROUND OF THE INVENTION

Positive grid design has a significant impact on the performance and the life of a lead-acid battery. Positive grids are subject to severe corrosion processes in the functioning of a lead-acid battery as it fulfills the role of the active material load-bearer and active material current collector. The rate of positive grid corrosion can become the life-limiting factor of the cell or the battery. Positive grids are designed so that the internal wire members provide sufficient strength and support to contain the active material and collect the current (energy) from the bulk of the active material and transmit to the straps and the terminals via the grid lugs. The design of the positive grids and the internal wire configurations are usually determined by the alloy composition, method of grid fabrication and the type of battery service in terms of energy, power density, service type, and service life requirements.

Over the years, considerable attention has been directed to a variety of different grid designs stated to be designed to enhance various performance characteristics. As one example, U.S. Pat. No. 3,989,539 to Grabb discloses a battery grid having a plurality of interconnected vertical and horizontal grid wires surrounded by frame bars. A series of the vertical grid wires are each tapered and increase in cross-sectional area in a direction towards the top of the grid, the point of current collection to the straps. Additional vertical grid wires are positioned between adjacent tapered vertical grid wires where the additional vertical grid wires extend downwardly from the top frame wire a distance of approximately 30 to 50% of the length of a side frame wire. This grid wire design, it is stated, was developed to increase and accommodate the increased flow of electrical current to the lug of the battery plate during high current discharge rates of the battery.

U.S. Pat. No. 4,099,309 to Bender discloses a process for manufacturing a grid which comprises cutting a series of equal length, parallel slits in a blank so that an area of double width appears besides each primary slit. Utilizing the procedures of the invention, it is stated that the grids cannot only be manufactured at low cost and with a saving of material, but that any damage to the crystalline structure of the material of the mesh bars is avoided and the discharge of the voltage potential established can take place via the shortest route and by way of optimal mesh bar cross-sections.

U.S. Pat. No. 4,221,852 to Qureshi discloses a battery grid having a lug on the upper edge and spaced from the corner of the frame, a set of wires parallel to one another connecting the side edges of the frame and a set of radial arms diverging away from the upper edge to connect that upper edge to each of the other three edges of the frame. Such grids were found to provide adequate rigidity without rendering such grids unduly heavy (the typical weight said to be about 58 grams). In addition, it is stated that these grids, in accordance with the invention and having the configuration illustrated in FIG. 2, were found to have an effective resistance of 1.03 mV/A or less, representing a very marked improvement in performance over prior known grid designs.

U.S. Pat. No. 4,555,459 to Anderson et al. discloses a lightweight battery grid having an array of grid wires arranged to define a plurality of parallelograms of substantially equal size. After having stated, by way of background, that consideration in the design of a grid structure must be given to minimizing grid weight, ensuring structural integrity and providing a geometry suitable for holding the active material in an efficient manner, one of the stated objects is to provide a lightweight battery grid which efficiently serves as a conductor for the active material which is pasted onto the grid.

U.S. Pat. No. 5,308,719 to Mrotek et al. discloses a lead-acid battery grid which includes a central plate lug with the grid being constructed in such a manner that the amount of metal is concentrated in the vicinity of the lug. It is stated that substantial manufacturing advantages result from the use of such grids, and the performance of the battery can be increased to the point that individual battery plates may be eliminated, resulting in lighter weight batteries and material costs savings.

As is apparent from these prior patents, there are a variety of demanding criteria which need to be addressed to provide grid designs for lead-acid batteries. An additional complication arises because lead-acid cell and battery manufacturers have a wide variety of processes that may be used to make grids for various applications, ranging from standby power or telecommunications applications to motive power uses and to starting, lighting and ignition (SLI) automotive and truck batteries. Traditionally, such lead-acid battery grids have been made by gravity casting techniques to which attention must be given to a variety of conditions to provide defect-free cast grids. Additionally, and more recently, there are many processes which have been proposed to allow grids to be made in a continuous fashion, utilizing continuous expanded grid fabrication processes or by, for example, a direct continuous grid casting process.

U.S. Pat. No. 5,434,025 to Rao et al. describe a particularly desirable expanded grid mesh made from a directly cast strip. While such grids and the batteries utilizing such grids have highly desirable performance characteristics, it would be desirable to even further enhance the design of these grids. Thus, because such grids lack vertical frame bars, such grids can be prone to higher grid growth rates in the vertical direction in service. Indeed, this higher vertical grid growth can result in premature battery failure due to the formation of internal shorts under the negative strap, particularly under high ambient temperature conditions in battery service.

In addition, the type of battery or cell design can provide further complications. As one example, the rate of positive grid corrosion can be, and usually is, much higher in sealed lead-acid cells and batteries (often termed "VRLA" for valve-regulated, lead-acid cells and batteries) than is the case with conventional, flooded electrolyte lead-acid batteries, such as are used for SLI automotive applications. Additionally, the positive grids used in large capacity industrial battery applications are relatively very thick in comparison to automotive grids and present unique challenges in grid casting. These grids have to be cast at relatively slower speeds to minimize grid wire cracking, and such grids exhibit great susceptibility to the formation of hot tears and hot cracks at the wire intersections when many types of alloys are used.

Despite all of the considerable effort in designing grids for lead-acid cells and batteries, there still exists a need for an optimized grid design which can satisfy to a greater extent than prior efforts have achieved the many, diverse, and demanding criteria. Indeed, and despite all of this prior effort, what appears to have been overlooked is an understanding that positive grid designs have special requirements that dictate design considerations quite separate from the considerations used designing negative grids in lead-acid cells and batteries.

It is, accordingly, an object of the present invention to provide a positive grid design capable of imparting to a lead-acid battery improved electrical performance and/or an enhanced cost-benefit relationship regarding such electrical performance.

Another object of this invention is to provide a lead-acid battery having enhanced power and energy densities. A related and more specific object is to provide such batteries having improved positive active material conductivity with this grid design. A still further object lies in the provision of a positive grid design capable of achieving savings in grid material weight.

An additional object of the present invention is to provide lead-acid batteries having enhanced positive grid corrosion resistance and reduction in the vertical grid growth in the expanded positive grids.

Still another object of this invention is to provide a lead-acid battery having enhanced formation efficiency.

Yet another object of the present invention lies in the provision of lead-acid batteries having increased efficiencies in positive active material utilization.

Other objects and advantages of the present invention will become apparent as the following description proceeds, taken in conjunction with the accompanying drawings.

SUMMARY OF THE INVENTION

In general, the present invention is predicated on the basic concepts of optimizing the internal positive grid wire geometry in the paste pellet areas for the active material so as to obtain overall enhanced positive plate performance through the enhancement of positive active material conductivity within the paste pellets. Thus, what has been discovered is that the positive grid designs being commercially used for lead-acid batteries of various types, particularly given the different processes used for making such grids, are far from an optimum design in terms of electrical performance. It has been found that substantial improvements in electrical performance are achieved by reducing the size of the individual paste pellet area while increasing the number of such paste pellet areas per unit of grid area.

Likewise, the preferred aspects of this invention are achieved by also reducing the farthest and closest distances from the center of the paste pellet to the adjacent grid wires. Indeed, and while reducing such distances, a more preferred aspect of this invention also reduces the differences between such furthest and closest distances as much as possible, consistent with processing considerations and other objectives.

Still further, a preferred use of the present invention also employs certain reduced ratios relating to the positive active material. Accordingly, the amount of the positive active material will be fixed by the desired capacity requirements for the lead-acid battery. However, by suitably increasing the grid wire surface area, it has been found that the resulting lower ratio (i.e., positive active material/grid wire surface area) in comparison to conventional lead-acid batteries allows substantially improved electrical performance to be obtained.

The recognition of the importance of the geometry of the optimized positive grids of the present invention provides the ability to tailor the grid design used to optimize the cost-benefit relationship. For example, in the case of automotive SLI batteries where unit cost constraints often are quite significant, the use of the present invention provides the ability to manufacture batteries of substantially equal performance with conventional batteries while achieving substantial, significant costs savings due to reduced grid material costs. Thus, the optimized grid geometry is accomplished with a proportional reduction in the cross-section of the internal intersecting grid wires in the positive grid.

In other lead-acid cells and batteries, such as, for example, in many motive power applications where the weight of the cells and batteries is significant because the power source serves as a counterbalance, the present invention provides the ability to achieve higher power and energy densities per unit positive grid weight that are significant.

Another aspect of a preferred embodiment of the present invention concerns providing an optimized grid wire configuration, particularly for lead-based eutectic group of alloys. Such optimized configurations reduce the incidence of casting defects such as hot-tears, hot cracks, and the like in the microstructure. Equally important, such optimized grid wire configurations result in a grid having highly desirable grain refinement, which grain structure and relative freedom from casting defects should result in a predictable and uniform lower overall corrosion rate exhibited by the positive grids in service.

BRIEF DESCRIPTION OF THE DRAWINGS

FIG. 1 is a side elevation view of one embodiment of a positive grid of the present invention;

FIG. 2 is a partial side elevation view of a positive plate made using the positive grid of FIG. 1 showing an important grid design parameter;

FIG. 15 is a cross-sectional view taken generally along line 15—15 of FIG. 14 and showing the offset positioning of the grid wires transverse to the longer dimension of the grid;

FIG. 16 is a cross-sectional view taken generally along line 16—16 of FIG. 14 and illustrating the configuration of the grid wires that extend parallel to the length of the grid;

FIGS. 17 and 18 are cross-sectional views taken generally along, respectively, lines 17—17 and 18—18 of FIG. 14 and showing the configuration of the grid frame bar extending transversely of the grid length and connecting with the grid lug; and FIGS. 19A and 19B, 20A and 20B, and 21A and 21B are photomicrographs at 200X amplification (FIGS. 19A and 19B) and 50X amplification (FIGS. 20A and 20B and FIGS. 21A and 21B), in which FIGS. 19A–21A show the grain structure of a positive grid gravity cast with a conventional grid configuration and FIGS. 19B–21B showing the microstructure of a positive grid gravity cast with the configuration shown in FIGS. 14–18, these grids being gravity cast using a lead-based alloy having 1.5% antimony and 1.65% cadmium by weight.

DETAILED DESCRIPTION OF THE INVENTION

Figure 3:
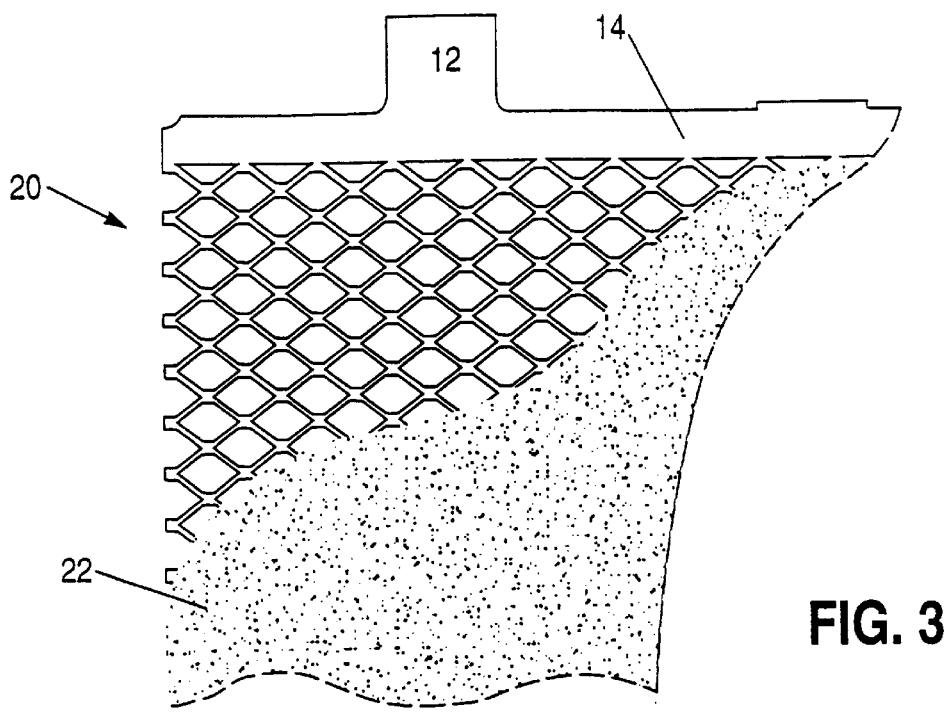
FIG. 3 is a partial side elevation view of a positive plate with the active material being partially removed to show the positive grid.

FIG. 1 shows a positive grid made from a directly cast strip. The positive grid 10 thus includes a lug 12, a top frame bar 14 and a bottom frame bar 16. The mesh design between the top and bottom frame bars 14 and 16, as shown, is in the form of diamonds as indicated generally at 18. The positive grids shown in FIG. 1 are preferably made by the process set forth in U.S. Pat. No. 5,434,025 to Rao et al. The alloy used to make the directly cast strip from which the expanded mesh grid is made can be any alloy suitable for lead-acid positive grid alloys, and many are known and have been used.

However, it is preferred to utilize a lead-based alloy containing, from about 0.02 to 0.05% or 0.06% calcium, from about 0.3 to about 0.5% or 0.6% tin, and from about 0.02 to 0.05% silver, the percentage is being based upon the weight of the alloy strip. The maximum tin content used may well be dictated by convenience and processing, as the higher tin contents generally provide stiffer strips that somewhat complicate the processing into the expanded mesh strips, e.g., the slitting and expanding steps. However, if desired, and consistent with other performance requirements, tin contents up to 0.7%, and even up to 0.8% or 1.0%, or so, can be tolerated.

In accordance with the present invention, the positive grid geometry utilizes individual paste pellet areas of a reduced size while increasing the number of such paste pellet areas per unit grid area in contrast to those conventionally used. In general, suitable grid geometry is achieved by increasing the number of the diamond-shaped, positive active material pellet openings in the height of the grid, i.e., measured from the top to the bottom frame bars. Thus, in comparison to conventionally used positive grids having about 14 diamonds, positive grids of the present invention will utilize at least 17 diamonds, preferably at least 19 and up to 22 or so. It may be possible to utilize an even a higher number of diamonds; however, as may be appreciated, there is a practical upper limit. More particularly, as the number of diamonds is increased with the concomitant increase in surface area, the size of the individual pellet openings is accordingly reduced, reaching a point where the desired pasting and paste adhesion characteristics for the active material to the grid become less desirable.

Inasmuch as the positive grid outer dimensions for SLI automotive batteries are typically fixed (e.g., within the standard BCI Group size specifications), increasing the number of diamonds will result in an increased number per square inch of plate area, each pellet area being of a concomitantly reduced size. Thus, the size of the individual paste pellet areas can vary in the range of from about 0.035 to about 0.095 square inches, while the number of such paste pellet areas per square inch of grid paste area (measured as the area pasted with positive active material and excluding the lug and frame bar areas, viz., the mesh area in FIG. 3) may vary from about 10.5 to about 28 per square inch of grid paste area. As one specific illustrative example, a 20 diamond positive grid has an individual diamond paste area of 0.067 square inches (about half the area of a similar grid with a 14 diamond design), while including about 14.3 paste pellets per square inch of grid area (almost twice the number using a 14 diamond design).

Similarly, with the amount of positive active material being fixed based upon the desired electrical capacity, the ratio of positive active material to the grid wire surface area is adjusted based on the performance required. To this end, and in accordance with the preferred aspects of the present invention for use in SLI automotive batteries and the like, suitable ratios can vary from about 0.25 gms./cm.$^2$, up to about 0.70 gms./cm.$^2$, the surface area being measured as the perimeter of the horizontal and vertical wires multiplied by their respective lengths. For example, the plate shown in FIG. 3 using the grid of FIG. 1 has 0.356 grams of positive active material per square centimeter of grid surface area.

A preferred embodiment of this invention utilizes reduced distances from the center of an individual pellet area to the center of the grid wire. As illustrated in FIG. 2, the distance from the center, C, to the respective grid wires (measured to the center of the respective grid wires) is identified as LWD (for the farthest distance) and as SWD (for the shortest distances). In accordance with this invention, for SLI batteries, SWD may vary from about 0.025 to about 0.11 inches while LWD can vary from about 0.05 to about 0.18 inches. Indeed, enhanced performance can be achieved when LWD is reduced so that the difference between LWD and SWD is zero, although other considerations (e.g., the mechanical properties) may make such reduction less desirable. As one illustrative example, the grid of FIG. 1 has a SWD of 0.107 inches and an LWD of 0.156 inches (in contrast, respectively, to SWD and LWD's for a 14 diamond design of 0.152 and 0.225 inches).

Suitable grids can be made by either gravity casting or by any of the many known continuous processes for making grids. The continuous process described in U.S. Pat. No. 5,434,025, using a directly cast strip, is preferred, and the disclosure of U.S. Pat. No. 5,434,025 is herein incorporated by reference. The process utilized to make the positive grids of the present invention will have some impact on the level of improvement imparted to the resulting battery; but the use of the present invention will consistently offer enhanced performance and/or significant savings in grid material.

While the illustrative embodiment includes diamond shaped pellet openings, it should be appreciated that the present invention is applicable to rectangular, square, or, indeed, any desired geometric shape for the pellet openings. The parameters described herein are thus fully applicable to any SLI positive grid and plate regardless of the geometric shape of the pellet opening and irrespective of the process used to make the grids.

Figure 4:
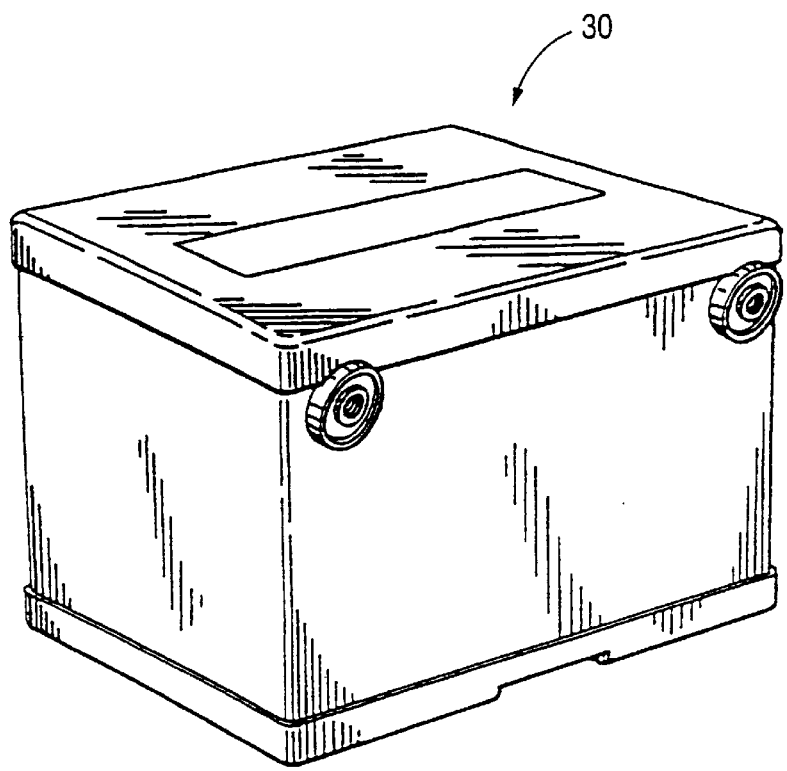
FIG. 4 is a perspective view of a maintenance-free battery of the present invention, and using the positive grids and plates of this invention.

FIG. 4 shows a typical battery 30 utilizing the grids and plates of FIGS. 1 and 3. As shown, battery 30 is a side terminal battery of a configuration used for SLI automotive battery. Beyond using at least some, and preferably all, positive grids and plates made using the optimized grid geometry of the present invention, the details of the battery construction can be any known or desired battery configurations useful for any lead-acid battery application. Thus, in addition to having any desired terminal configuration (i.e., top, side or dual terminal), the internal construction can use any desired materials for the negative alloys and for the separators. All of the construction details are well within the skill of the art and are well known.

Batteries of the present invention, utilizing positive grids and plates having the optimized geometry as described herein, offer the battery manufacturer the ability to provide SLI lead-acid batteries having electrical performance characteristics ranging from the same as that of conventional batteries (while enjoying grid material savings that are substantial) to substantially greater electrical performance (at the same grid weight as that of conventional batteries). This substantial performance improvement results from the optimized positive grid geometry considerations which alter the corrosion rate, increase positive paste conductivity and positive active material utilization resulting in enhanced formation efficiencies and power and energy densities.

Figure 5:
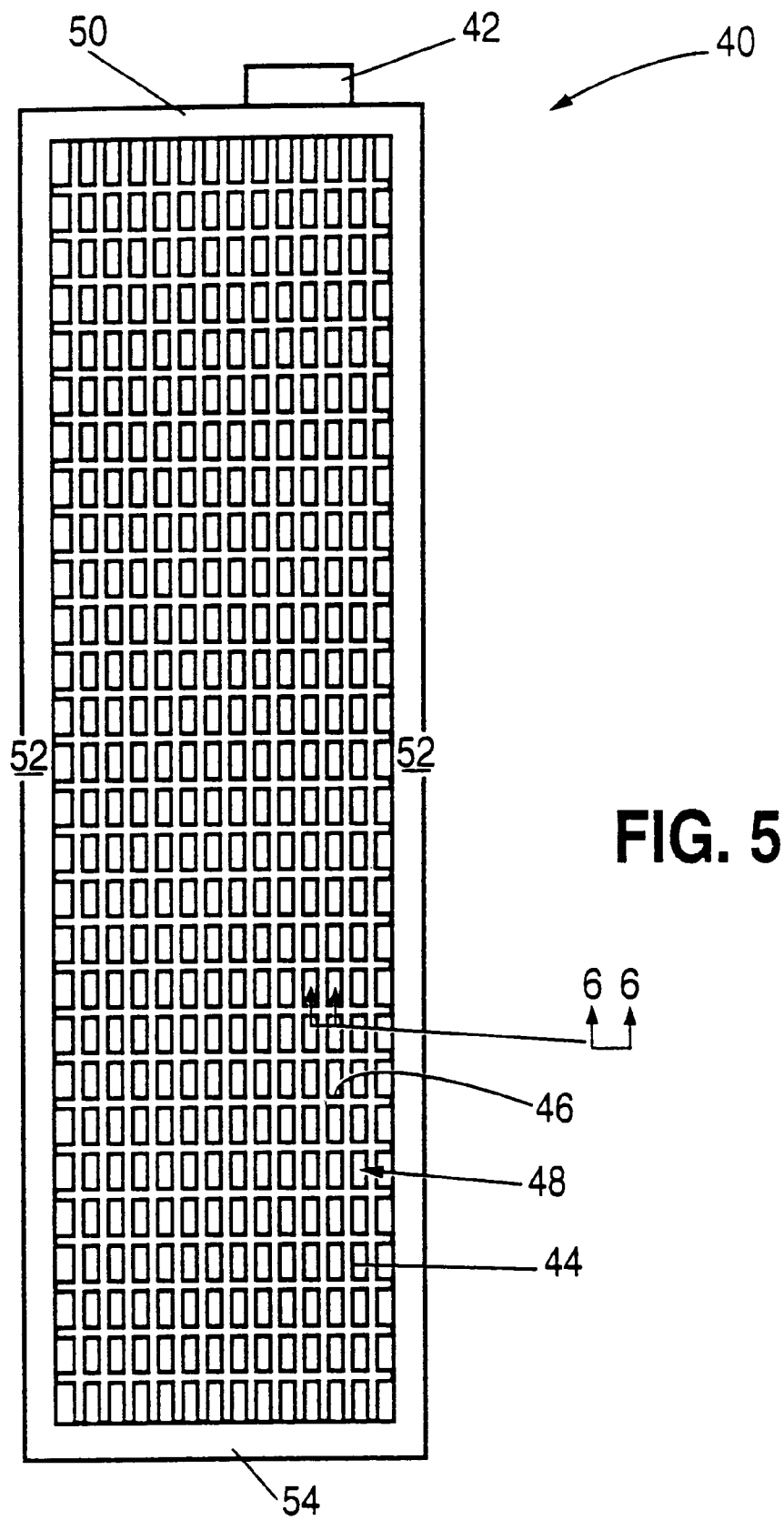
FIG. 5 is a side elevation view of another embodiment of a positive grid of this invention.

FIG. 5 shows a positive grid of a configuration useful for large capacity industrial battery applications. Grid 40 thus includes a lug 42, vertical grid wires 44, horizontal grid wires 46, the intersections forming individual pellet areas shown generally at 48. These vertical and horizontal wires, as is shown, are interior to the respective frame bars of the grid 40, i.e., top frame bar 50, side frame bars 52, and bottom frame bar 54.

As was the case with the illustrative grid embodiment shown in FIG. 1, the positive grid 40 shown in FIG. 5 possesses similar geometry parameters. In industrial battery applications, the size of the positive grids used are based upon the capacity provided by the cell. Thus, positive grids for such applications are defined as, for example, 100 Amp positive grids. The size can range from 10 to 100 Amp up to about 1000 Amp positive grids. However, the size of the positive grid can be that desired for the particular configuration and capacity of the cell. Positive grids and plates of the present invention for industrial battery applications (both sealed-VRLA and conventional flooded electrolyte cells and batteries) can have individual paste areas of 0.1 to about 0.4 square inches and about 2.5 to about 10 paste pellets per square inch of grid area. SWD's and LWD's, in the preferred embodiment, can range, respectively, from about 0.08 to about 0.20 and 0.15 to 0.35 inches. The ratio of the grams of positive active material paste per square centimeter of grid wire surface area can vary from about 0.6 to 1.7.

As one illustrative example, a 100 Amp positive grid can have the following grid and plate geometry (typical values for conventional industrial grids and plates are in parentheses): individual paste pellet area—0.18 in.$^2$ (0.609); 5.5 paste pellets per in.$^2$ of grid area (1.64); SWD—0.143 inches (0.301); LWD—0.314 inches (0.505) and 1.65 (1.8) grams of positive active material per cm.$^2$ of grid wire surface area.

Positive grids of the size used for industrial cell/battery applications are relatively thick (e.g., 2.5 to 6.5 mm thickness) in comparison to positive grids used for automotive applications, and thus present unique challenges in grid casting. Such grids should be cast or otherwise made in a fashion to minimize grid wire cracking at the wire intersections. Thus, these grids exhibit a significant susceptibility to the formation to hot tears and cracks at the thicker wire intersections particularly during grid casting with many types of alloys based on eutectic or peritectic phase compositions.

In accordance with one preferred aspect of the present invention, for particular use in VLRA-sealed battery applications, the positive grid internal wire configuration should be generally cylindrical or elliptical in cross-section. In this fashion, such positive grids so configured will facilitate uniform solidification during grid casting with reduced, and minimal, solidification-induced stresses. By utilizing this aspect of the present invention, gravity casting will result in grid wires which are relatively free of casting defects like hot tears along the grain boundaries and micro-hot cracks along the interdendritic boundaries.

Figure 6:
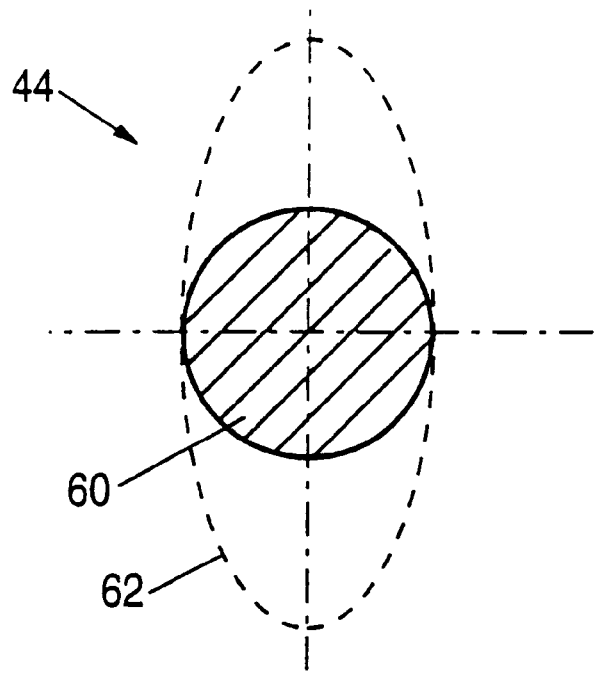
FIG. 6 is a cross-sectional view, taken generally along the line 6—6 of FIG. 5 and showing one embodiment of a preferred cross-section of the grid wire and illustrating in dotted lines another desirable cross-section.

The wire diameter chosen may be varied as desired. Suitable wire diameters will, in general be based upon the corrosion rate of the alloy utilized to provide the desired target battery or cell service life. The corrosion rate applicable for the grids of this invention can be readily determined by straightforward techniques as are known. FIG. 6 shows the cross-section for the positive grids preferred for VRLA applications. Thus, vertical grid wires 44 (and horizontal grid wires 46 as well) have a cylindrical cross-section as seen at 60. Dotted line 62 shows an alternative desired elliptical cross-section.

Figure 7:
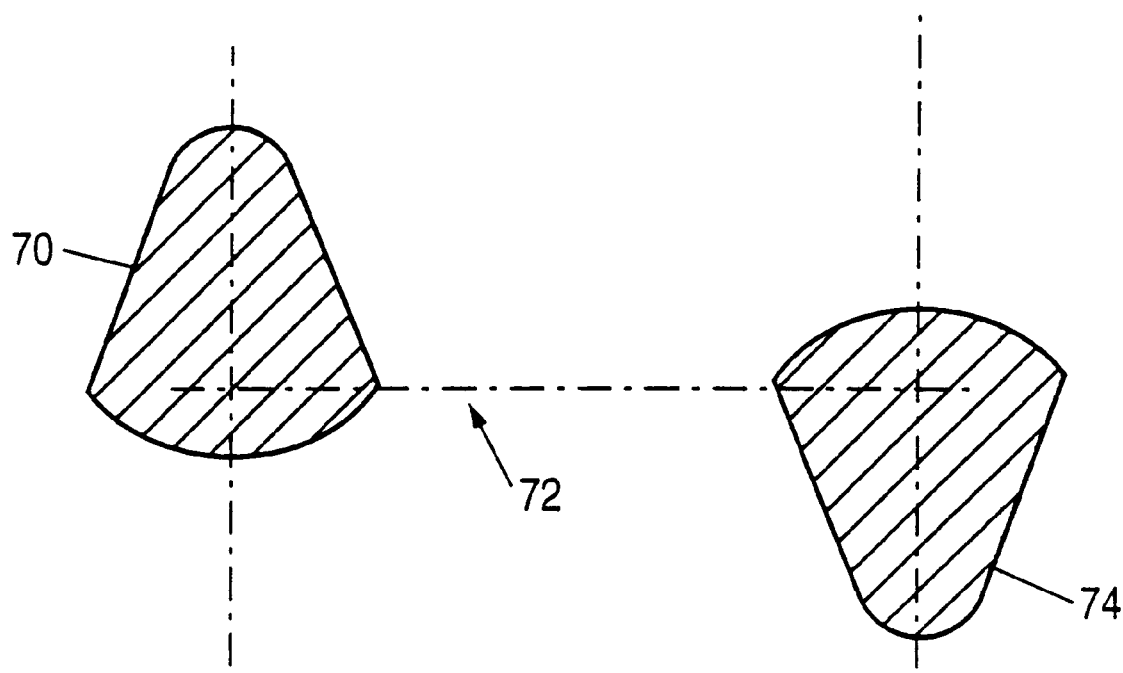
FIG. 7 is a cross-sectional view of yet another embodiment of a positive grid according to the present invention.

Pursuant to yet another optional aspect of the present invention, particularly when the grids are cast, the positive grid configuration can be designed to enhance its active material retention characteristics. As may be appreciated, such enhanced characteristics become more desirable as the active material pellet areas become smaller and smaller in the optimization of the grid configuration. To this end, an offset wire arrangement can be used in which adjacent grid wires (vertical, horizontal, or both) are offset from the vertical plane of the grid. Thus, as shown in FIG. 7, grid wire 70 is offset outwardly from the vertical plane shown at 72 while adjacent grid wire 74 is offset outwardly from vertical plane 72 in the opposite direction. In this fashion, the thickness of the grids is increased, thereby enhancing active material retention without concomitantly requiring any increase in positive grid material. Any offset pattern which enhances the active material retention can be used.

Figure 8:
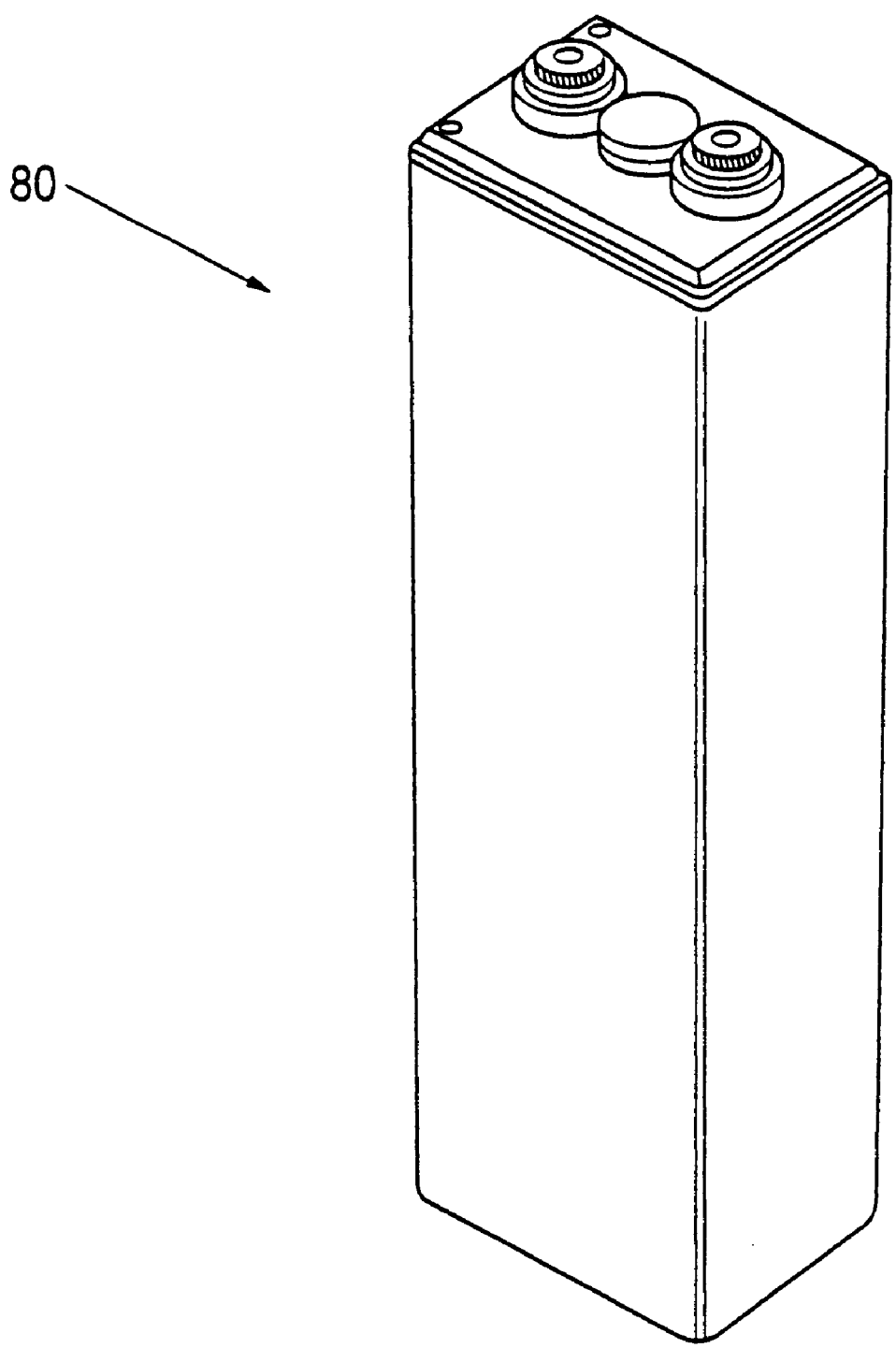
FIG. 8 is a perspective view of a VRLA battery of the present invention using positive grids as shown in FIG. 5.

FIG. 8 shows a VRLA cell 80 utilizing the positive grid embodiment shown in FIG. 5. The configuration, including the separators and the negative grid alloys, do not form a part of the present invention. Any of a wide variety of configurations and internal constructions are known and may be used.

As is seen in FIG. 8, in comparison to an automotive battery, the VRLA cell 80 has a relatively high aspect ratio (i.e., height/width ratio). However, this container geometry simply exemplifies a useful example of a suitable sealed VRLA cell. Thus, many conventionally used sealed VRLA cells provide increased capacity by using taller cells while maintaining the other dimensions relatively constant due to space constraints in the particular application. However, as may be appreciated, the particular outer dimensions or configurations of the VRLA cell or battery can be varied as desired.

The same design flexibility offered by the present invention and discussed in connection with automotive batteries is available when designing sealed VRLA cells and batteries. As an illustrative example, sealed VRLA cells and batteries can offer significant advantage compared to conventional flooded cells and batteries for motive power applications, such as forklift trucks. In these application, particularly demanding situations can arise such as occur when relatively heavy loads must be moved, requiring that the motive power battery source be capable of delivering satisfactory performance at high discharge rates. The present invention offers the ability to provide substantially enhanced performance to more readily deal with such rigorous requirements. As an illustrative example, one suitable 100 A positive grid comprises 10 elliptical vertical wires and 24 horizontal wires with the following parameters: approximate weight—953 gm., pellet height 0.717 inch, pellet width—0.399 in., corrosion radius—0.047 in., individual paste pellet area—0.2861 in., SWD—0.1995 in., LWD—0.3585 inc., number of paste pellet areas per square inch of grid area—3.49, and a median voltage drop of 55.220 mV at 100 Amps per positive grid. Yet another illustrative positive grid includes, 13 round vertical and 27 horizontal wires with the following approximate weight–953 gm., pellet height—0.628 in. pellet width—0.287 in., corrosion radius —0.05 in., individual paste pellet area—0.18 in.$^2$, 5.5 paste pellet areas per square inch of grid area, SWD—0.143 in., LWD—0.314 in., and median voltage drop of 49.628 mV.

The positive grid geometry of the present invention can be utilized for providing positive grids and plates for any lead-acid cell or battery application. One such application is for electric vehicles. The respective parameters applicable to this application are set forth in the following approximate ranges: individual paste pellet area—0.04 to 0.14 in.$^2$; 7 to 25 paste pellet areas per in.$^2$ of grid area; SWD—0.06 to 0.16 inches; LWD—0.01 to 0.22 inches, and 0.3 to 0.9 grams of positive active material paste per cm.$^2$ of grid wire surface area. As one illustrative example, for a 13.7 Ampere Hour/plate positive grid (6.035 inches wide by 6.43 inches in height), the following parameters are provided (the parenthetical values being those for a conventional geometry grid for this application): individual paste pellet area—0.133 in.$^2$ (0.19), 7.25 (5.25) paste pellets per in.$^2$ of grid area; SWD—0.149 (0.193) inches; LWD—0.225(0.245) inches; and 0.89 (0.98) grams of positive active material per cm.$^2$ of grid wire surface area.

Figure 14:
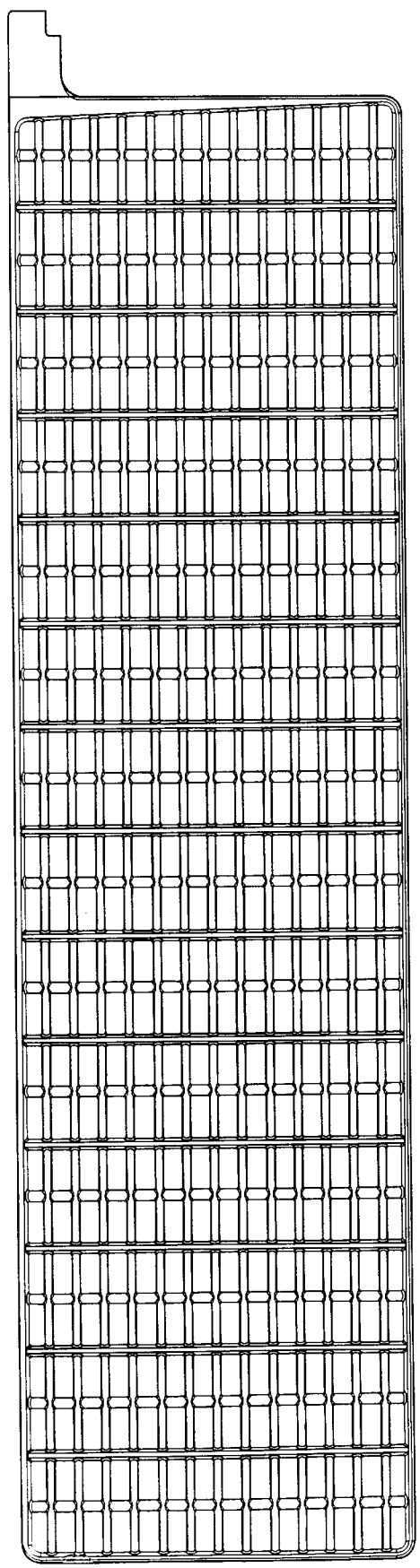
FIG. 14 is a plan view of one preferred embodiment of a positive grid used for sealed cells.

FIGS. 14–18 illustrate one preferred embodiment of a positive grid which incorporates an optimized grid wire configuration, utilizing the features shown in FIGS. 6 and 7 for use in a VRLA cell or battery. Thus, as shown in FIG. 14, positive grid 90 includes a lug 92, outside frame bar 94 and top frame bar 96 which merges into lug 92.

Two sets of grid wires are included. Vertical grid wires 98 (viewed when the lug 92 is upstanding) run the length of grid 90, and horizontal grid wires 100 extend transversely across grid 90.

As can best be seen in FIG. 15, adjacent horizontal grid wires 100 are offset with respect to each other so as to enhance retention of the active material after the grids are pasted. Further, and consistent with optimizing the geometry grid wire configuration, horizontal grid wires 100 have a radius at their top and bottom, indicated at 102 and 104, respectively. Sides 106 need to be tapered so as to provide a relief angle (as indicated at 108) so that the cast grid can be removed from the mold.

The size of the grid wires and the respective radii and relief angles employed can be varied as desired and considered useful. Typically, in current commercial use, the positive grids will vary in size from about a 40 Amp to 100 Amp size. As one illustrative example of a satisfactory 100 Amp grid size, the radii at the top and bottom can be about 0.08 and 0.03 inch with a relief angle of about 25°.

As to the top frame bar 96, the interior relief angle can be 25° (as indicated at 110 in FIGS. 17 and 18) and the exterior relief angle can be about 150 (as indicated at 112 in FIGS. 17 and 18). These angles are thus the same for the top frame bar and which merges into lug 92 (FIG. 17) as well as for the distant end (FIG. 18). The preference for the shape of this top frame bar 96 provides improved conductivity.

The vertical grid wires 98 (FIG. 16) are essentially circular in cross-section. Thus, said grid wires have segments (indicated at 114 and for an illustrative 100 Amp size grid have a radius of 0.04 inch), with a relief angle (25° being the example shown as indicated at 116) and flat areas 118 (such flat areas being utilized to ease manufacture of the grid mold). While the radius and relief angles used are illustrative and useful, it should be appreciated that these may be varied as desired.

As may be appreciated, the configuration of the vertical and horizontal grid wires could be reversed from what is illustrated herein. Thus, if desired, the vertical grid wires could be offset and the horizontal wires could be essentially circular in cross-section.

Further, if desired, the same or similar configurations could be used. Likewise, the particular configuration can be varied as desired.

However, consistent with the preferred embodiment of this invention, the optimized configuration of the grid wires is essentially circular in cross-section. By this terminology, what is intended is that any departure from a circular cross-section is minimized to the extent consistent with molding and the desired paste retention characteristics. The use of such essentially circular, cross-section wire geometry in the horizontal and/or vertical wires greatly minimizes the solidification-induced stress cracking and associated brittleness in the lead-based eutectic alloy grids. Uniform solidification will result in absence of hot cracks along the interdendritic boundaries and hot tears along the grain boundaries.

Thus, particularly for lead-based eutectic alloys, as has been discussed herein, it has been found that such essentially circular grid wires provide grids with extensive grain and matrix interdendritic boundary refinement as well as the absence of large hot-tear and hot-crack defects at the grain boundaries in the wire intersections. Such extensive grain refinement and relative freedom from casting defects should result in predictable and uniform lower overall corrosion rate of the thus-configured positive grids in service.

Figure 19A:
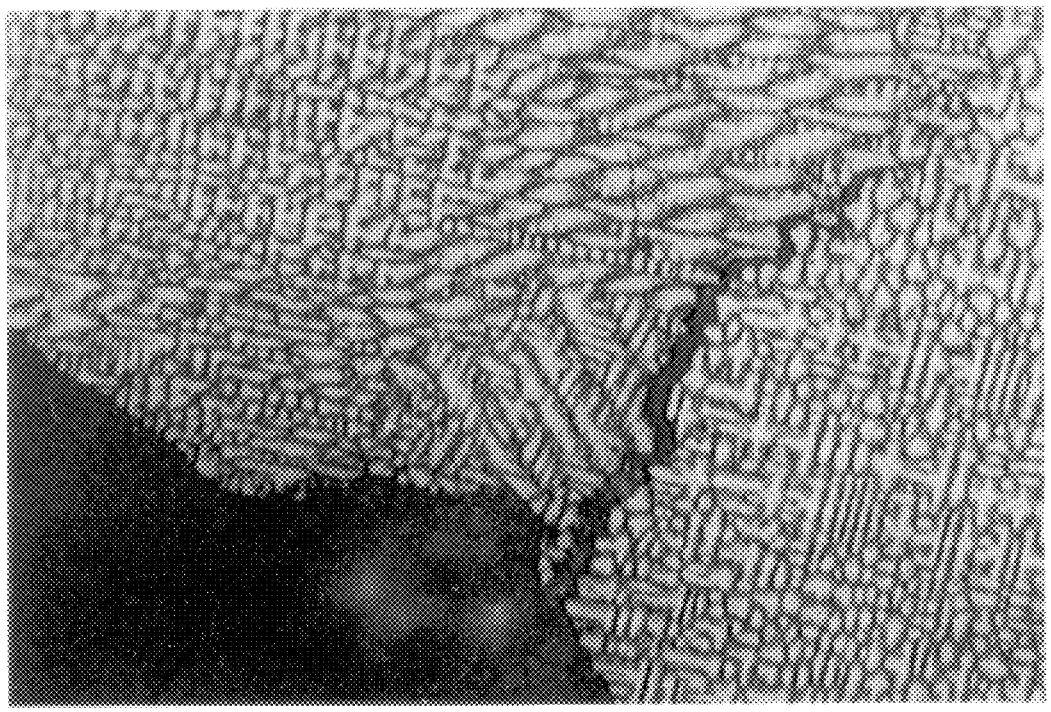
Figure 19B:
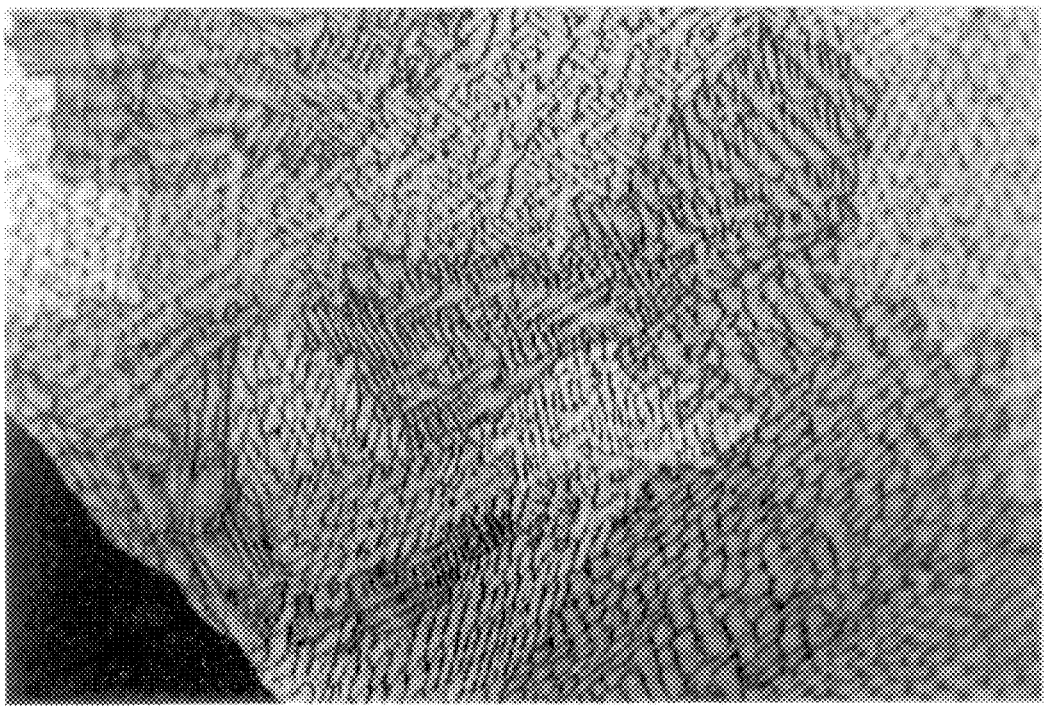
Figure 20A:
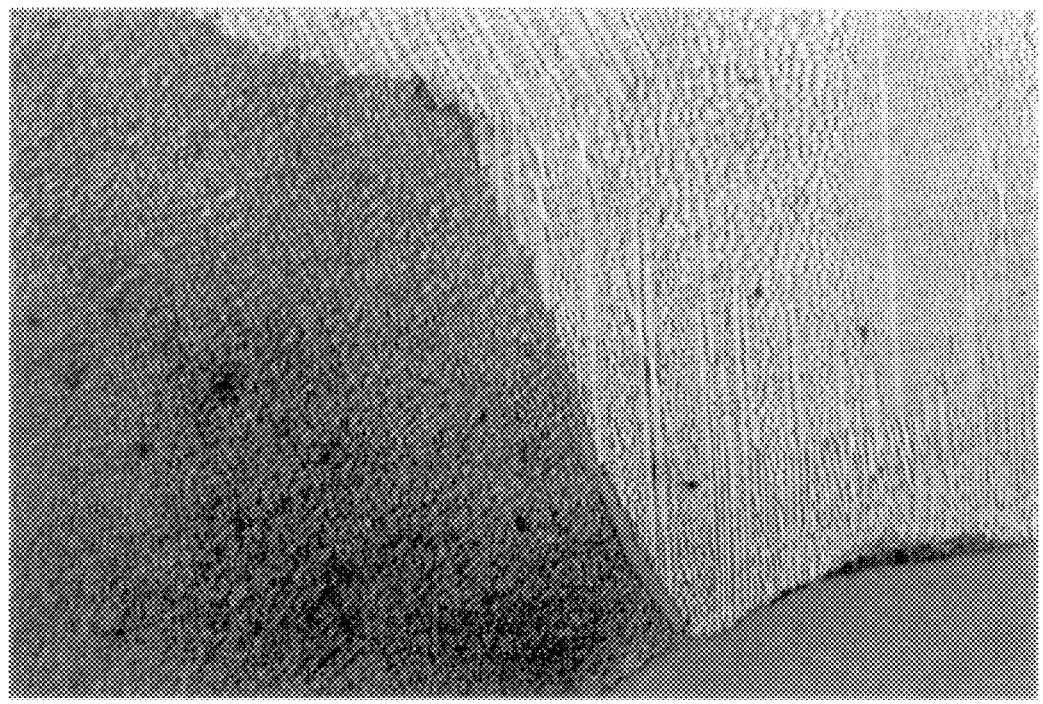
Figure 20B:
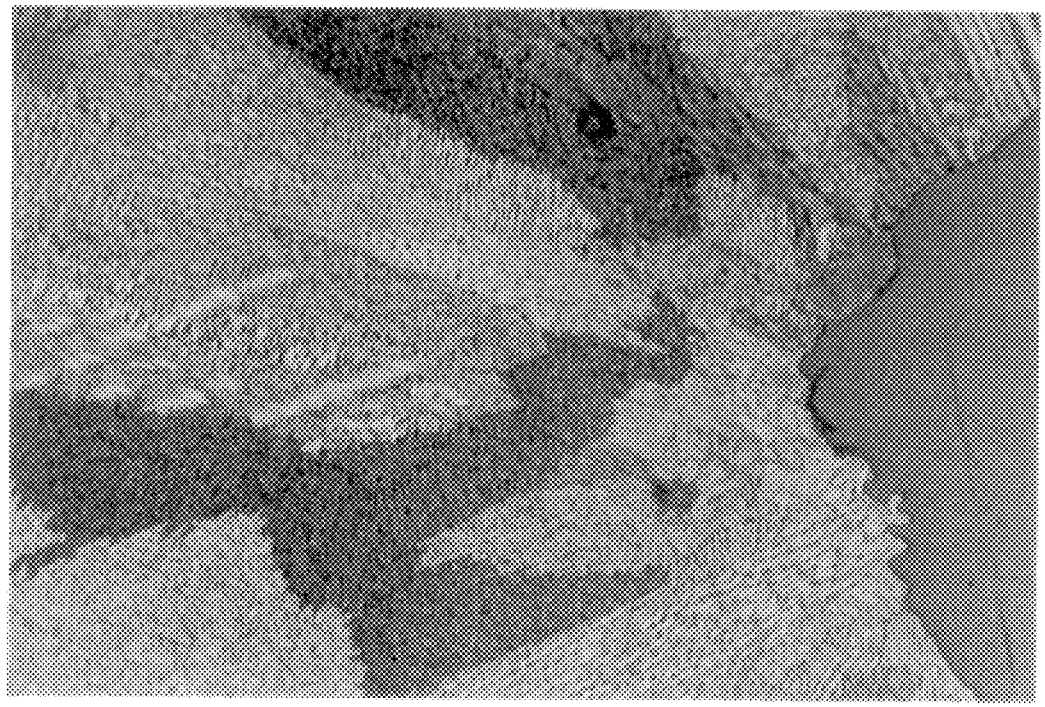
Figure 21A:
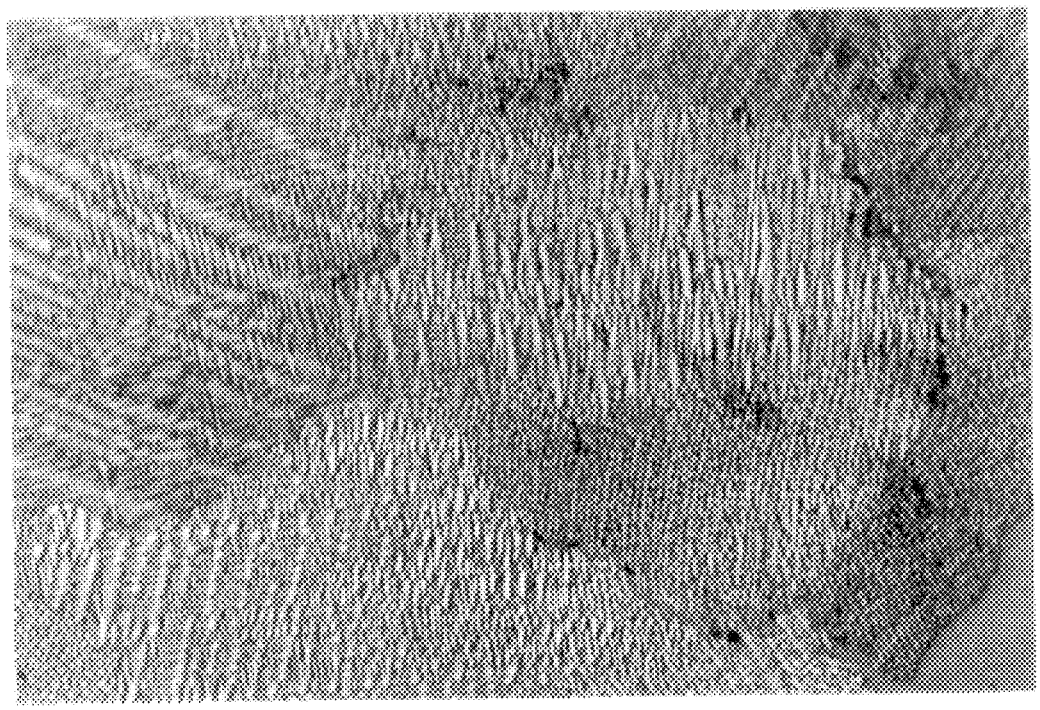
Figure 21B:
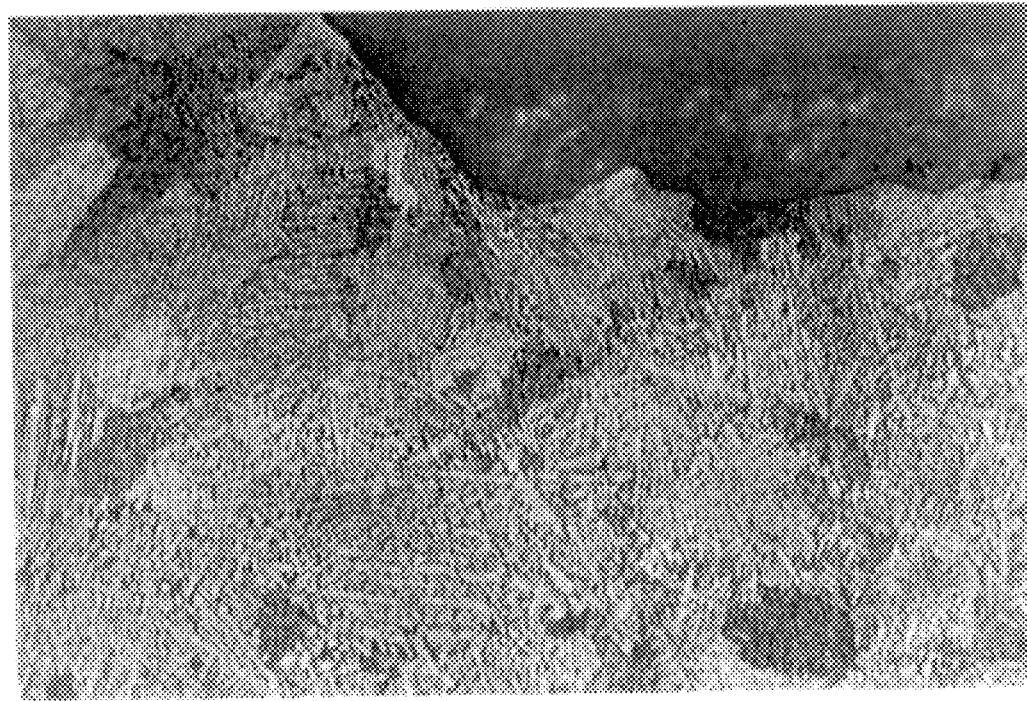

The difference in the microstructure appearance between existing grid configurations and grids having the optimized wire configurations of this invention can be seen by comparing FIGS. 19A versus 19B, 20A versus 20B, and 21A versus 21B. The relative freedom from heat-tears and the like of the grids of this invention (FIGS. 19B–21B) and the extensive grain refinement are in sharp contrast to what can be seen when prior wire geometries are used (see FIGS. 19A–21A).

These photomicrographs reflect grids gravity cast with lead-based cadmium-antimony alloys have about 1.5% antimony and 1.65% cadmium, based upon the total weight of the alloy constituents as added. Alloys of this type represent one desirable lead-based eutectic alloy family.

More particularly, the Sb-Cd-Pb ternary system forms a pseudo binary Pb-SbCd eutectic system. Essentially a 1:1 atomic (molar) ratio of antimony and cadmium is needed to optimize the benefits of an eutectic alloy system. Such a system results in good grid castability, higher grid stiffness due to the distribution of the eutectic phase in the matrix, extremely refined subgrains or interdendritic boundaries that results in superior grid corrosion resistance and uniform corrosion attack, microstructural stability throughout the cell or battery service life and on-charge voltage stability by minimizing the effect of antimony poisoning of the negative paste due to higher stability of the SbCd intermediate phase.

In general, useful alloys of this family contain cadmium and antimony in an amount of from about 0.5% to 2.0%, based upon the total weight of the alloy. Preferably, the content of both cadmium and antimony each are at least about 1.0% by weight of the total alloy. A more preferred range is from about 1.0% to 1.3% for antimony and the same range for cadmium. Typically, cadmium may be lost during alloy preparation so that adding an excess of cadmium is preferred, about 7% by weight excess up to 18% or so will be suitable.

The following Example is illustrative, but not in limitation of the present invention. The alloy compositions are based upon the total weight of the alloy.

EXAMPLE

This Example compares the electrical performance of batteries made using conventional positive grids in comparison to batteries of the present invention utilizing positive grids having the geometry according to this invention. A series of BCI Group 24 were built. Each battery included the number 14 plates per cell with an opposing plate surface area of 334.5 in. A separator (i.e., polyethylene silicate (Duramic ®) having a thickness of 0.040 inch was used, and the negative plates were enveloped. The negative grid alloys used were: 0.08 Ca, 0.38 Sn-Pb alloy expanded negatives. The positive grids had the following compositions Ca—0.045%, Sn—0.5%, Ag—0.032%, Al—0.01%, and the remainder being Pb.

The batteries utilizing positive grids of conventional designs were made both using gravity casting and continuous processing, using a process as described in U.S. Pat. No. 5,434,025. Prior Art Battery 1 utilized the process of the '025 patent to form positive grids in a 14 diamond configuration. Positive grids in a 14 diamond configuration were also made by gravity casting, and the batteries utilized are designated as Prior Art Battery 2. The positive grids in the batteries of the present invention, identified as Battery 3, were gravity cast in a 20 diamond configuration.

The individual grid weights and the electrical performance are set forth in Table 1. The initial best performance data is based upon an average of six batteries while the 167° F. cycle life is from an average of two batteries. As to the other data, these were obtained from an average of 5 batteries. The positive active material efficiency is based upon the unformed positive paste weight.

TABLE 1

| Positive Grid Type | Grid Wt. grams | Best RC Cap Mins. | CCA Performance at 0° F. | | | −20° F. at 300A | | Best 20 Hr. Cap. Ah | RC Efficiency Mins/lb of PAM | 20 Hr. Efficiency AH lb of PAM | 167° F. J-240 Life |
|---|---|---|---|---|---|---|---|---|---|---|---|
| | | | 5 sec V | 30 sec V | 6 V secs | 10 sec V | 5 V secs | | | | |
| Prior Art Battery 1 14 dia | 57.5 | 106.1 | 7.74 | 7.08 | 41.5 | 9.05 | 77.3 | 58.2 | 112 | 61.3 | 3400 |
| Prior Art Battery 2 Cast 14 diamond | 57.5 | 107.4 | 7.74 | 7.15 | 47.1 | 9.09 | 93.9 | 56.9 | 112 | 60.1 | 4000 |
| Battery 3 Cast 20 diamond | 52.0 | 115.9 | 7.67 | 7.19 | 55.8 | 9.11 | 108.1 | 60.8 | 121 | 63.3 | 4000 |

If desired, silver can be added to such alloys in an amount effective to increase the strength and/or stiffness and/or corrosion resistance. An illustrative useful range is from about 0.016% to 0.03% silver, based upon the total weight of the alloy.

In addition, other lead-based eutectic alloy systems that can be utilized with the present invention include Sn-Pb binary alloys, Sb-Pb binary alloys and calcium-tin lead-based alloys in which the tin content is relatively high (i.e., about 1.0% by weight or higher). Useful levels of the alloying ingredients are known and may be employed.

Figure 9:
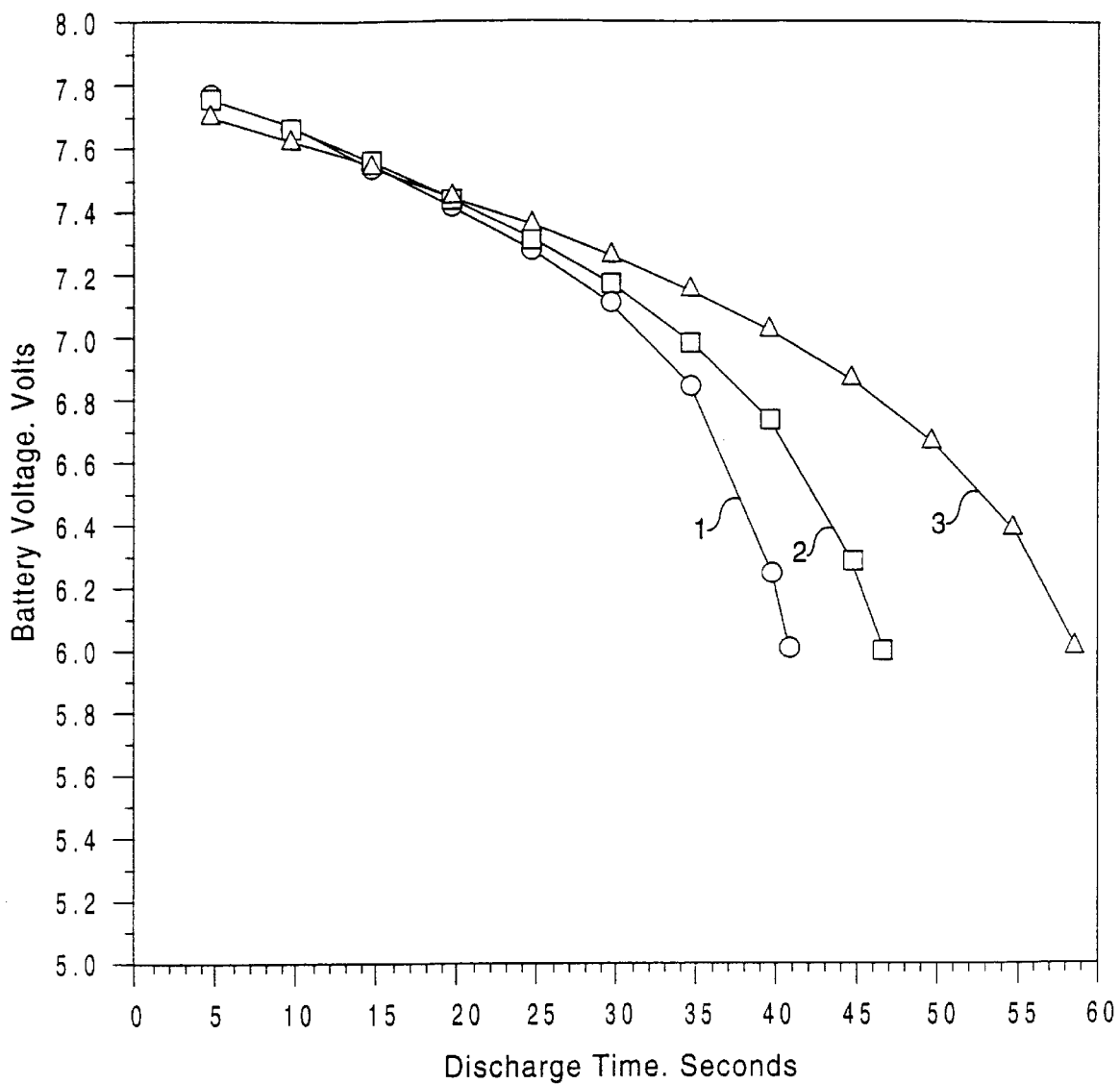
FIG. 9 is a graph of battery voltage versus discharge time and comparing the 0° F. discharge performance at 625 Amps of the use of conventional positive grids in comparison to the use of a positive grid design according to the present invention.
Figure 10:
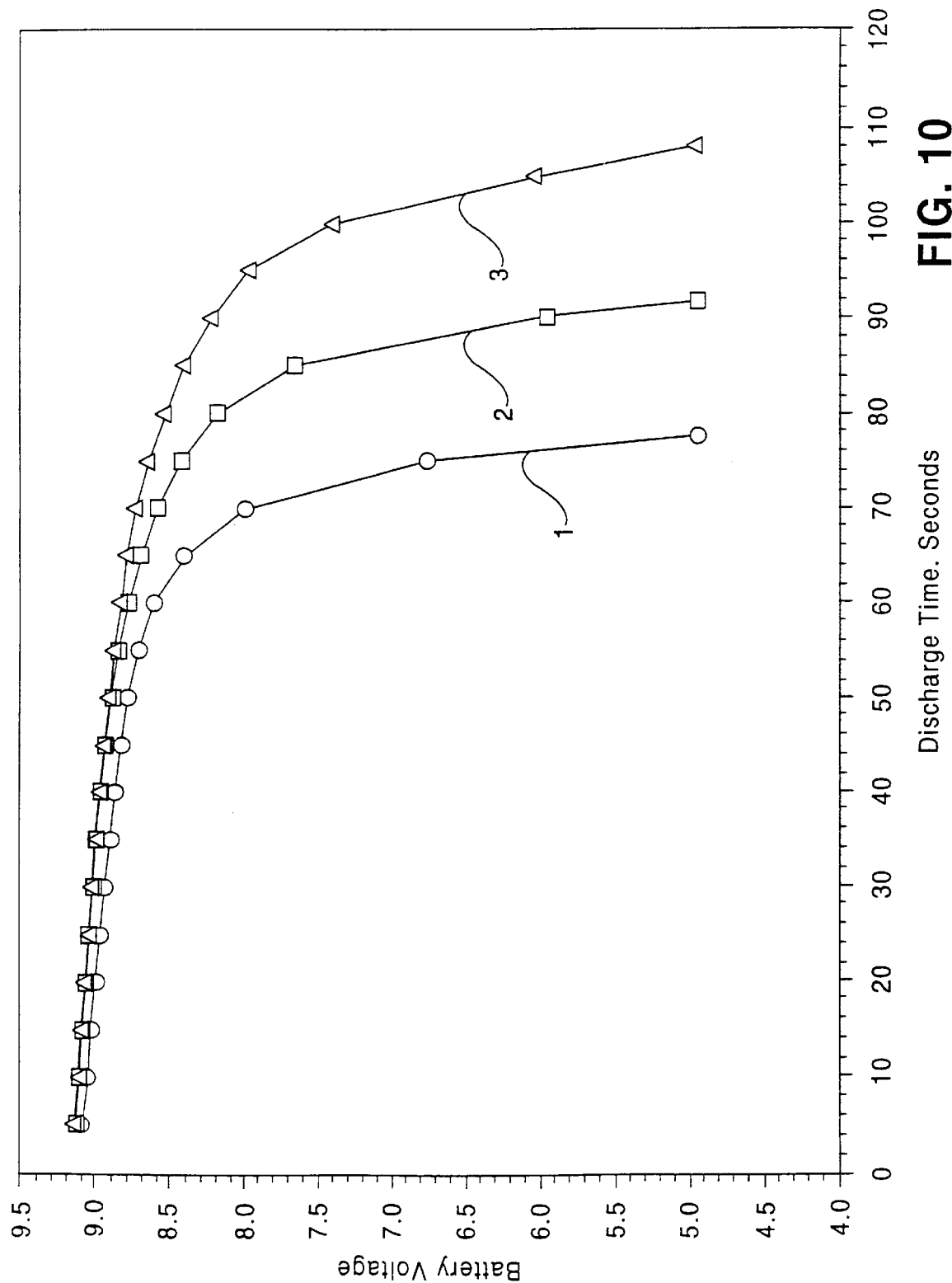
FIG. 10 is a graph similar to that of FIG. 9, except showing the −20° F. discharge performance at 300 Amps.

FIGS. 9 and 10 graphically demonstrate the 0° F. and minus 20° F. performance, respectively, of the various batteries. Batteries 1 and 2 are the prior art batteries, while Battery 3 is a battery according to the present invention, as was previously discussed. As can be seen, batteries utilizing positive grids of the present invention (i.e., Battery 3) exhibit enhanced performance, which is considered to be substantial.

Table 2 sets forth the absolute gassing current values in mAmps at 80° F., 125° F. and 140° F.

TABLE 2

| | Battery 1 14 Diamond Expanded Positive, 57.5 gm grid | | | Battery 2 14 Diamond Gravity Cast Positive, 57.5 gm grid | | | Battery 3 20 Diamond Gravity Cast Positive, 52.5 gm grid | | |
|---|---|---|---|---|---|---|---|---|---|
| Float Volts | mAmps at 80 F. | mAmps at 125 F. | mAmps at 140 F. | mAmps at 80 F. | mAmps at 125 F. | mAmps at 140° F. | mAmps at 80 F. | mAmps at 125 F. | mAmps at 140 F. |
| 13.5 | 20 | 59 | 87 | 20 | 60 | 88 | 20 | 59 | 83 |
| 13.8 | 25 | 86 | 114 | 25 | 81 | 115 | 25 | 77 | 98 |
| 14.1 | 35 | 111 | 133 | 35 | 111 | 145 | 35 | 108 | 131 |
| 14.4 | 45 | 130 | 147 | 45 | 134 | 155 | 45 | 129 | 142 |
| 14.7 | 55 | 163 | 199 | 55 | 169 | 204 | 50 | 155 | 184 |
| 15.0 | 75 | 224 | 298 | 75 | 241 | 299 | 70 | 212 | 280 |
| 15.3 | 110 | 347 | 467 | 110 | 340 | 472 | 105 | 332 | 421 |
| 15.6 | 170 | 574 | 764 | 180 | 615 | 804 | 170 | 536 | 717 |

Table 3 below is similar to that of Table 2, except expressing the float charging behavior at the temperatures set forth in mAmp/Ah based upon the best 20 hr., Capacity.

TABLE 3

| | Battery 1 14 Diamond Expanded Positive, 57.5 gm grid | | | Battery 2 14 Diamond Gravity Cast Positive, 57.5 gm grid | | | Battery 3 20 Diamond Gravity Cast Positive, 52.5 gm grid | | |
|---|---|---|---|---|---|---|---|---|---|
| Float Volts | mA/AH at 80 F. | mA/AH at 125 F. | mA/AH at 140 F. | mA/AH at 80 F. | mA/AH at 125 F. | mA/AH at 140 F. | mA/AH at 80 F. | mA/AH at 125 F. | mA/AH at 140 F. |
| 13.5 | 0.34 | 1.01 | 1.49 | 0.35 | 1.05 | 1.55 | 0.33 | 0.98 | 1.38 |
| 13.8 | 0.43 | 1.48 | 1.96 | 0.44 | 1.42 | 2.02 | 0.41 | 1.28 | 1.63 |
| 14.1 | 0.60 | 1.91 | 2.29 | 0.62 | 1.95 | 2.55 | 0.48 | 1.79 | 2.17 |
| 14.4 | 0.77 | 2.23 | 2.53 | 0.79 | 2.36 | 2.72 | 0.75 | 2.14 | 2.35 |
| 14.7 | 0.95 | 2.80 | 3.42 | 0.97 | 2.97 | 3.59 | 0.83 | 2.57 | 3.05 |
| 15.0 | 1.29 | 3.85 | 5.12 | 1.32 | 4.24 | 5.25 | 1.16 | 3.52 | 4.64 |
| 15.3 | 1.89 | 5.96 | 8.02 | 1.93 | 5.98 | 7.30 | 1.74 | 5.51 | 6.98 |
| 15.6 | 2.92 | 9.86 | 13.13 | 3.16 | 10.81 | 14.13 | 2.82 | 8.89 | 11.89 |

Figure 11:
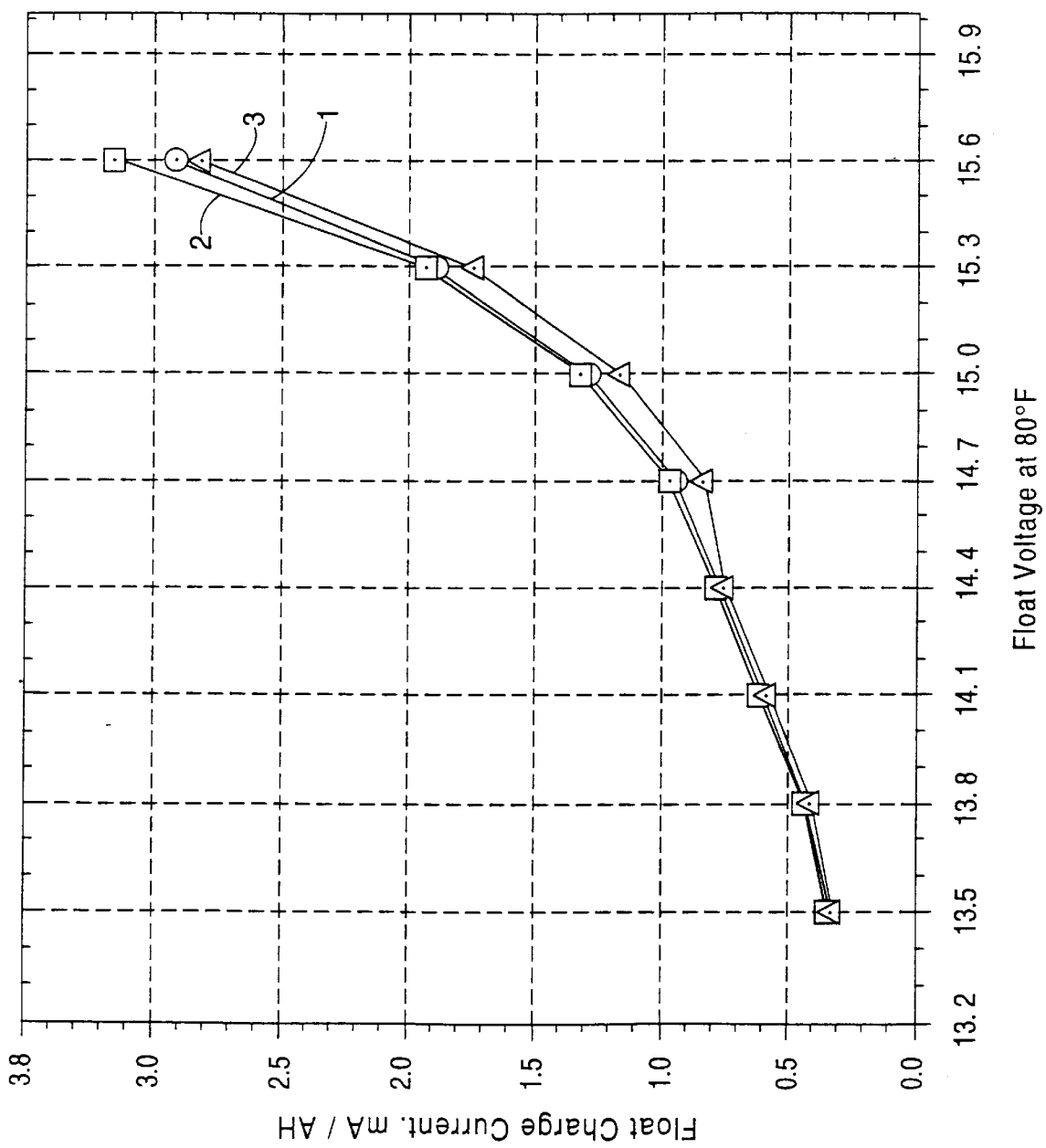
FIG. 11 is a graph of the float charge current versus the float voltage and comparing the performance of batteries using positive grids as in FIG. 10, the performance being the float charging behavior at 80° F.
Figure 12:
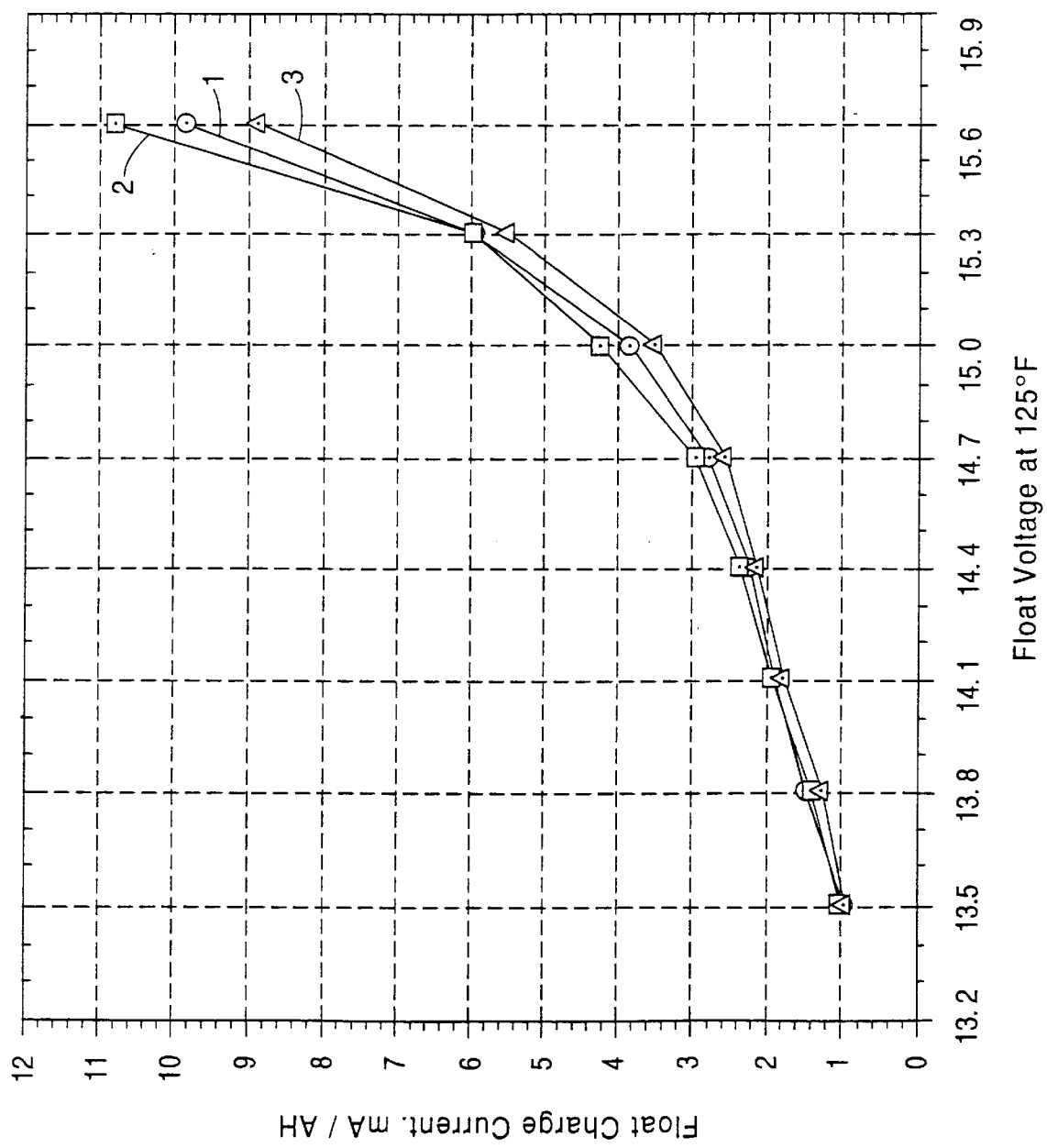
FIG. 12 is a graph similar to FIG. 11, except showing the comparative performance of batteries for the float charging behavior at 125° F.
Figure 13:
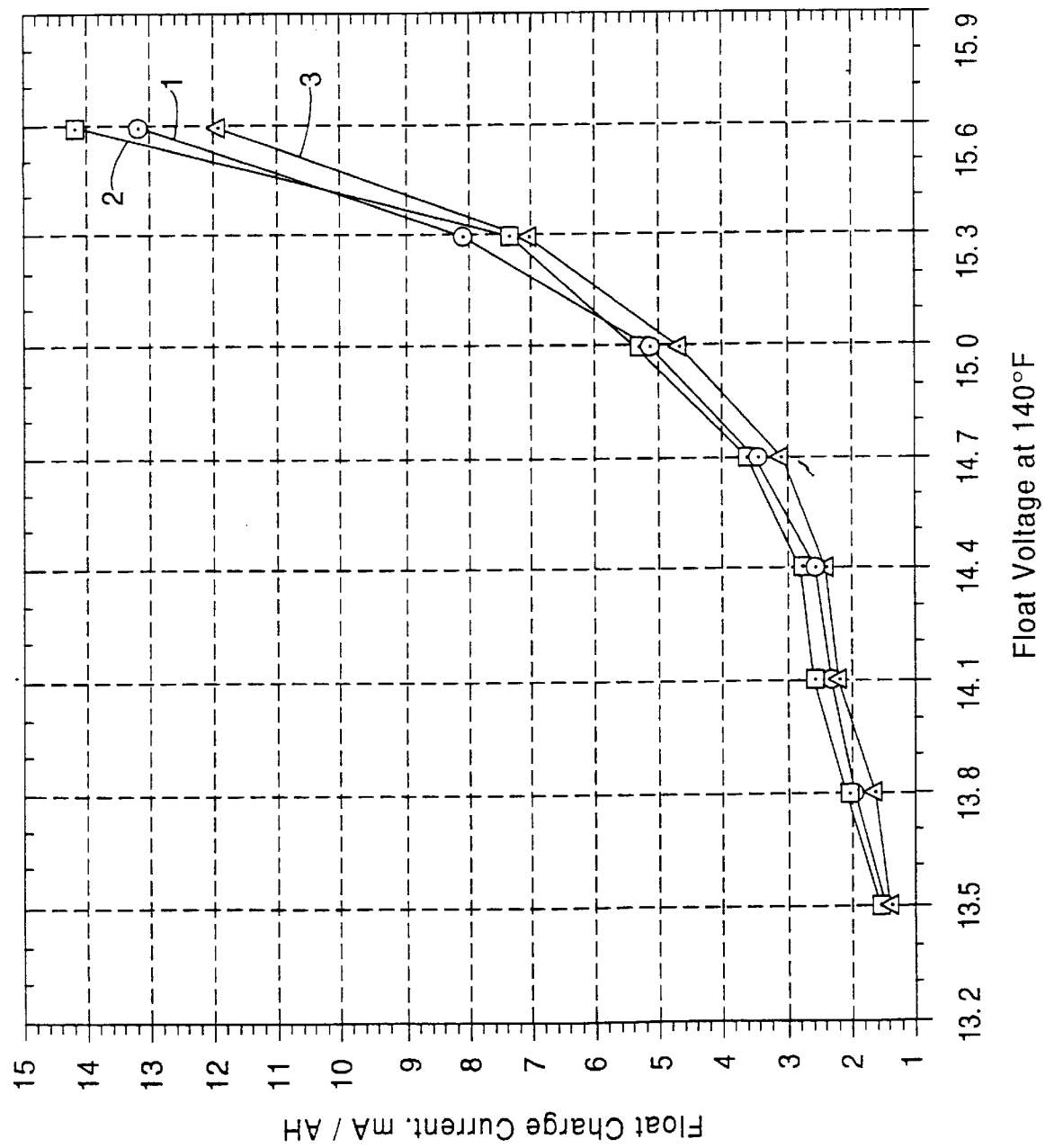
FIG. 13 is a graph similar to FIG. 11, except showing the float charging behavior at 140° F.

FIGS. 11–13 graphically illustrate the float charging behavior of the various batteries at temperatures of 80° F., 125° F. and 140° F. As noted regarding FIGS. 9 and 10, prior art batteries are labeled as Batteries 1 and 2 and Battery 3 is a battery according to this invention. As can be seen, the batteries utilizing positive grids having the geometry of the present invention (i.e., Battery 3) offer advantages which are considered significant, wherein the normalized float currents are lower, which illustrates the lower corrosion rates.

Thus, as has been seen, the present invention provides batteries capable of yielding either substantially improved electrical performance or cost savings due to savings in positive grid weight. Indeed, considered from the standpoint of a national automotive battery manufacturer, the savings in material costs which can be achieved are substantial. While the present invention is susceptible to various modifications and alternative forms, specific embodiments thereof have been described in detail herein. It should be understood, however, that it is not intended to limit the invention to the particular forms disclosed, but, on the contrary, the intention is to cover all modifications, equivalents and alternatives falling within the spirit and scope of the invention as expressed in the approved claims.

I claim:

1. A SLI lead-acid battery positive plate comprising a grid having a lug, a top frame bar to which the lug is connected and a grid mesh defining paste pellet openings and positive active material adhered to said grid mesh, the area of said paste pellet openings being from about 0.035 to about 0.095 square inches and from about 10.5 to about 28 paste pellet openings per square inch of grid mesh area.

2. The plate of claim 1 wherein each paste pellet opening is defined by intersecting grid wires defining a closest and farthest distance from the center of the paste pellet opening to the adjacent grid wires, wherein said closest distance is from about 0.025 to 0.11 inches and said farthest distance is from about 0.05 to 0.18 inches.

3. The plate of claim 2 wherein there are from about 0.25 to about 0.7 grams of positive active material per square centimeter of said grid mesh surface area.

4. The plate of claim 1 wherein said grid wire mesh is an expanded grid mesh.

5. The plate of claim 4 wherein said expanded grid mesh is made from a directly cast strip and said plate includes a bottom frame bar attached to said grid mesh.

6. The plate of claim 1 wherein said grid being of a lead based alloy consisting essentially of lead, from about 0.02 to 0.06% calcium, from about 0.3 to about 0.9% tin, and from about 0.02 to 0.045% silver, the percentages being based upon the weight of the grid.

7. The plate of claim 6 wherein the tin content is in the range of from about 0.3 to about 0.6%.

8. A SLI lead-acid battery positive plate comprising a grid having a lug, a top frame bar to which the lug is connected, an expanded grid mesh and a bottom frame bar, the expanded grid mesh being connected and positioned between the top and bottom frame bars, positive active material adhered to the expanded grid mesh, the expanded grid mesh defining paste pellet openings having a diamond shape and said grid having at least 17 diamonds measured along a line from the top to the bottom frame bar.

9. The plate of claim 8 in which there are at least 19 diamonds.

10. The plate of claim 9 in which there are at least 20 diamonds.

11. The plate of claim 10 in which there are at least 22 diamonds.

12. An automotive SLI battery comprising a battery container having a plurality of cells and an electrolyte contained in the cells, each cell having a plurality of positive plates as defined in claim 1.

13. An automotive SLI battery having a plurality of positive plates as defined in claim 2.

14. An automotive SLI battery having a plurality of positive plates as defined in claim 3.

15. A lead-acid positive plate suitable for an industrial battery comprising a grid having a lug, a top frame bar to which the lug is connected, a grid mesh, and a bottom frame bar, and vertical side frame bars, the grid mesh being connected and positioned between the top, vertical and bottom frame bars, positive active material adhered to said grid mesh, the grid mesh defining paste pellet openings having an area of from about 0.1 to about 0.4 square inches, and said grid having from about 2.5 to 10 paste pellet openings per square inch of grid mesh.

16. The plate of claim 15 wherein intersecting grid wires define the paste pellet openings and include a farthest and a closest distance from the center of the paste pellet opening to the center of the adjacent grid wire, said farthest distance being from about 0.15 to 0.35 inches and said closest distance being from about 0.08 to 0.20 inches.

17. The plate of claim 16 wherein there are about 0.6 to 1.7 grams of positive active material per square centimeter of grid wire surface area.

18. The plate of claim 15 wherein said grid is of a cadmium-antimony lead-based alloy in which the cadmium and antimony are each present in an amount of 0.5% to 2.0% based upon the total weight of the alloy.

19. The plate of claim 18 wherein the cadmium and antimony are each present in an amount of at least about 1.0%.

20. The plate of claim 19 wherein the cadmium and antimony are present in said alloy in about a 1:1 atomic ratio.

21. The plate of claim 20 in which the cross-section of the grid mesh is essentially circular.

22. An industrial lead-acid cell having positive plates as defined in claim 15.

23. An industrial lead-acid cell having positive plates as defined in claim 16.

24. An industrial lead-acid cell having positive plates as defined in claim 17.

25. An industrial lead-acid cell having positive plates as defined in claim 18.

26. An industrial lead-acid cell having positive plates as defined in claim 19.

27. An industrial lead-acid cell having positive plates as defined in claim 20.

28. A lead-acid positive plate suitable for an electric vehicle comprising a grid having a lug, a top frame bar to which the lug is connected, a grid mesh and a bottom frame bar, the grid mesh being connected and positioned between the top and bottom frame bars, positive active material adhered to said grid mesh, said grid mesh defining a plurality of paste pellet openings having an area of from about 0.04 to 0.14 square inches and from about 7 to about 25 paste pellet openings per square inch of said grid mesh.

29. The plate of claim 28 wherein said grid mesh includes intersecting grid wires defining the paste pellet openings and having a farthest distance from the center of the paste pellet opening to the adjacent wire and a closest distance, said closest distance being from about 0.06 to 0.16 inches and said farthest distance being from about 0.1 to about 0.22 inches.

30. The plate of claim 29 wherein about 0.30 to 0.9 grams of positive active material per square centimeter of grid wire surface area are included.

31. The plate of claim 28 wherein said grid is of a cadmium-antimony lead-based alloy in which the cadmium and antimony are each present in an amount of 0.5% to 2.0% based upon the total weight of the alloy.

32. The plate of claim 31 wherein the cadmium and antimony are each present in an amount of at least about 1.0%.

33. The plate of claim 32 wherein the cadmium and antimony are present in said alloy in about a 1:1 atomic ratio.

34. A lead-acid battery suitable for an electric vehicle having positive plates as defined in claim 28.

35. A lead-acid battery suitable for an electric vehicle having positive plates as defined in claim 29.

36. A lead-acid battery suitable for an electric vehicle having positive plates as defined in claim 30.

37. A lead-acid battery suitable for an electric vehicle having positive plates as defined in claim 31.

38. A lead-acid battery suitable for an electric vehicle having positive plates as defined in claim 32.

39. A lead-acid battery suitable for an electric vehicle having positive plates as defined in claim 33.

* * * * *